United States Patent [19]
Guilbault et al.

[11] 3,907,891
[45] Sept. 23, 1975

[54] PURIFICATION OF METHACRYLAMIDOPROPYLTRIME-THYLAMMONIUM CHLORIDE

[75] Inventors: Lawrence James Guilbault, McMurray; Frederick Alan Hoffstadt, Coraopolis, both of Pa.

[73] Assignee: Calgon Corporation, Pittsburgh, Pa.

[22] Filed: Oct. 21, 1974

[21] Appl. No.: 516,554

[52] U.S. Cl. .................................................. 260/561 N
[51] Int. Cl.² ........................................ C07C 103/44
[58] Field of Search ................................. 260/561 N

[56] References Cited
UNITED STATES PATENTS

| | | | |
|---|---|---|---|
| 2,865,960 | 12/1958 | Shearer et al. | 260/561 N |
| 3,170,901 | 2/1965 | Melamed et al. | 260/561 N |
| 3,652,671 | 3/1972 | Barron | 260/561 N |
| 3,661,868 | 5/1972 | Barron | 260/561 N |

OTHER PUBLICATIONS

Hoke et al., J. of Polymer Science: Part A–1, Vol. 10, 595–604, (1972).

*Primary Examiner*—C. Davis
*Attorney, Agent, or Firm*—Rudolph J. Anderson, Jr.; Harry E. Westlake; Martin L. Katz

[57] ABSTRACT

Methacrylamidopropyltrimethylammonium chloride, or the free amine, is purified by contacting aqueous solutions containing the salt or the free amine with activated carbon.

6 Claims, No Drawings

PURIFICATION OF METHACRYLAMIDOPROPYLTRIMETHYLAMMONIUM CHLORIDE

This invention relates to a new process for the purification of methacrylamidopropyltrimethylammonium chloride or of the free amine, dimethylaminopropylmethacrylamide, through the application of adsorption techniques. More particularly, the instant invention relates to the purification, by both batch and continuous processing, of aqueous solutions of methacrylamidopropyltrimethylammonium chloride or dimethylaminopropylmethacrylamide by passing such solutions through an activated carbon adsorption column, or by contacting such solutions with activated carbon in a batch treatment tank.

Methacrylamidopropyltrimethylammonium chloride, among its other uses, is an important monomer in the synthesis of a class of water soluble cationic polymers which find application as flocculants and as retention aids in the production of paper as taught by U.S. Pat. No. 3,661,880.

Aqueous solutions of commercially available methacrylamidopropyltrimethylammonium chloride or the free amine, vary in color from light yellow to dark amber. This color, or impurity, is carried through upon polymerization of the monomer resulting in polymer products of low molecular weight and widely varying color. Low molecular weight and the wide spread variation in product color results in polymers having unacceptable performance characteristics. Further, the impurity in the monomer also may cause other undesirable polymer variations such as variations in clarity and viscosity.

Although applicants have found that the impurities may be removed effectively from the free amine by vacuum distillation techniques leading to a preferential distillate which is clear and "water white" and which, upon subsequent polymerization, led to a clear and "water white" polymer product, such vacuum distillation techniques do not lend themselves readily to continuous processing and are prohibitively expensive as a commercial process. In addition, the amine is easily activated in this form and may polymerize at distillation temperature, creating additional and undesirable processing problems.

The instant invention is based upon applicants' discovery that, surprisingly, the impurities are removed when aqueous solutions of methacrylamidopropyltrimethylammonium chloride or dimethylaminopropylmethacrylamide are passed through a granular activated carbon adsorption column, or contacted with activated carbon in a batch tank. Effluents from a single pass of both solutions taken from such columns or separated from batch tank suspensions by filtration are "water white" and clear and, in this respect, are indistinguishable from purified solutions obtained by vacuum distillation. When polymerized, the carbon-treated monomer produces a clear, "water white" polymer product suitable in all respects as an electroconductive polymer for use in the manufacture of electroconductive base sheets. It is contemplated, therefore, that aqueous solutions of commercially available methacrylamidopropyltrimethylammonium chloride and dimethylaminopropylmethacrylamide will be purified by contacting such solutions with an effective quantity of activated carbon.

Any granular or powdered activated carbon may be employed as the adsorbent in the purification process of the instant invention. Desirably, such activated carbon will have a mesh size of from about 8 to about 325 mesh (United States Sieve Series). Preferably, such activated carbon will have a mesh size of from about 14 to about 40 mesh. Typical activated carbon adsorbents which may be employed include, for example, Pittsburgh Activated Carbon type "SGL" Activated Carbon (8 × 30 United States Sieve Series), and Pittsburgh Activated Carbon type "CPC" (14 × 40 United States Sieve Series). The treatment level of activated carbon may vary from a level of 1 to 3,500 pounds of monomer per pound of carbon, but a treatment level of about 7 to 160 pounds of monomer per pound of carbon is generally preferred in column operation and from about 4 to about 10 pounds in batch operation. The concentration of the monomer in the aqueous solution used as the starting material for purification may vary from 1 to 99 percent by weight. Usually the concentration is about 50 percent by weight.

Advantages to be obtained through practice of the purification process of the instant invention and the best mode contemplated by applicants for carrying out the process of the instant invention are illustrated in the following example.

EXAMPLE 1

150 grams of Pittsburgh Activated Carbon type "SGL" (8 × 30) Activated Carbon were repeatedly washed in hot tap water to remove most of the fines. The carbon was then rinsed several times in distilled water and boiled in the final rinse for 20 to 30 minutes. This hot slurry was used to pack a 500 ml. chromatographic column that was 42 centimeters long and had a diameter of 2.5 centimeters. The packed carbon was backwashed with cold tap water until no fines could be seen in the effluent. A 50 percent aqueous solution of methacrylamidopropyltrimethylammonium chloride containing 50 ppm. copper as copper sulfate was run through the column at approximately one drop per second.

To a 100 ml. flask fitted with a Teflon paddle stirrer, nitrogen purge tube, condensers, and thermometer was charged 50 grams treated methacrylamidopropyltrimethylammonium chloride solution. The contents were heated to 40° C. and purged with nitrogen for one hour. To the contents were added 0.000891 grams Fe(NH$_4$)$_2$(SO$_4$)$_2$· 6H$_2$O as an aqueous solution (5 ppm. Fe), 4 drops of Versenex 80 and 17 ml. Lupersol 11 (5 × 10$^{-4}$ moles t-butylperoxypivalate/mole monomer). The reaction solution was stirred for 24 hours and the intrinsic viscosity of the resultant polymer was compared to that obtained by polymerization of untreated monomer, as set forth in the following table:

|  | $[\eta]$ | 40° C. 1 MNaNO$_3$ |
|---|---|---|
| Untreated Monomer |  | 1.51 |
| Carbon-treated Monomer |  | 5.74 |

We claim:

1. The process for purifying aqueous solutions of methacrylamidopropyltrimethylammonium chloride or the free amine thereof which comprises passing an aqueous solution containing from 1 to 99 percent by weight of methacrylamidopropyltrimethylammonium chloride or the free amine thereof through an adsorption column packed with activated carbon having a mesh size between 8 to 325 mesh at a treatment level of from 1 to 3,500 pounds of methacrylamidopropyltrimethylammonium chloride or the free amine thereof per pound of activated carbon.

2. The process of claim 1 wherein the treatment level is from 7 to 160 pounds monomer per pound of carbon.

3. The process of claim 2 wherein the activated carbon has a mesh size between 8 and 30 mesh.

4. The process for purifying aqueous solutions of methacrylamidopropyltrimethylammonium chloride or the free amine thereof which comprises slurrying an aqueous solution containing from 1 to 99 percent by weight of methacrylamidopropyltrimethylammonium chloride or the free amine thereof with activated carbon having a mesh size between 8 and 325 mesh at a treatment level of from 1 to 3,500 pounds of methacrylamidopropyltrimethylammonium chloride or the free amine thereof per pound of activated carbon and separating the purified solution from the slurry.

5. The process of claim 4 wherein the treatment level is from 4 to 10 pounds monomer per pound of carbon.

6. The process of claim 5 wherein the activated carbon has a mesh size between 8 and 30 mesh.

* * * * *